United States Patent [19]

Boldt

[11] 4,356,206
[45] Oct. 26, 1982

[54] METHOD OF MASSAGING MEAT PRODUCTS

[76] Inventor: Wesley H. Boldt, 230 Thornton Ave., Des Moines, Iowa 50321

[21] Appl. No.: 231,387

[22] Filed: Feb. 4, 1981

[51] Int. Cl.$^3$ ............................................... A23P 1/00
[52] U.S. Cl. ..................................... 426/519; 99/485; 366/139; 426/641
[58] Field of Search .................. 426/519, 641; 99/348, 99/454, 485; 366/139

[56] References Cited

U.S. PATENT DOCUMENTS 4,038,426  7/1977  Jespersen et al. .................. 426/519

OTHER PUBLICATIONS

The National Provisioner, Sep. 13, 1980 (pp. 26, 28, 30 and 35).

Primary Examiner—Raymond N. Jones
Assistant Examiner—George C. Yeung
Attorney, Agent, or Firm—Zarley, McKee, Thomte, Voorhees & Sease

[57] ABSTRACT

A meat massage machine is disclosed comprising a closable container having two shafts extending therethrough with a plurality of smooth, closely spaced paddles thereon. The shafts are individually powered by hydraulic motors. A vacuum pump or the like is in communication with said container. Discharge ports are located in the container adjacent one end of each shaft.

The method comprises placing ham portions or the like in said container, rotating said shafts in opposite directions so that ham portions between the shafts are moved upwardly therebetween by said paddles while a vacuum is drawn continuously on said container; rotating said shafts at 9–18 rpm's for 10–90 minutes whereby the massaged ham will have protein extruded therefrom for purposes of subsequently adhering the ham portions together, and releasing the vacuum and reversing the direction of rotation of said shafts to discharge said ham portions through the discharge ports.

1 Claim, 6 Drawing Figures

U.S. Patent  Oct. 26, 1982  Sheet 1 of 2  4,356,206
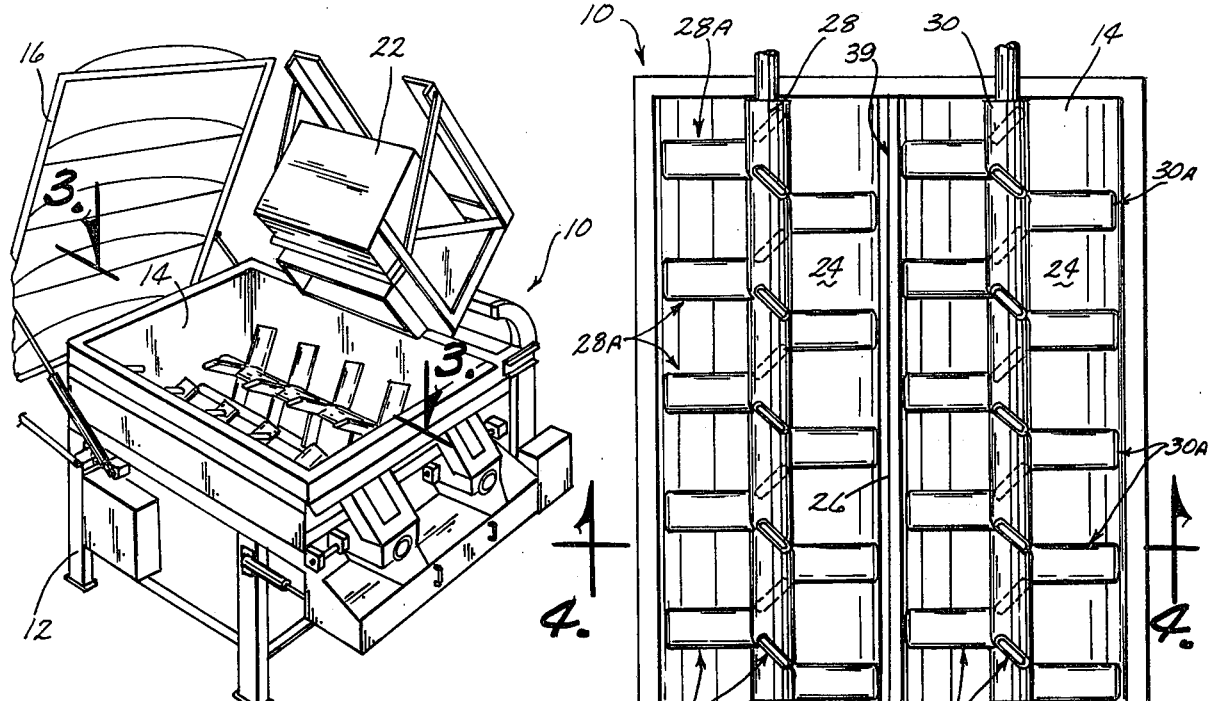
Fig. 1
Fig. 3
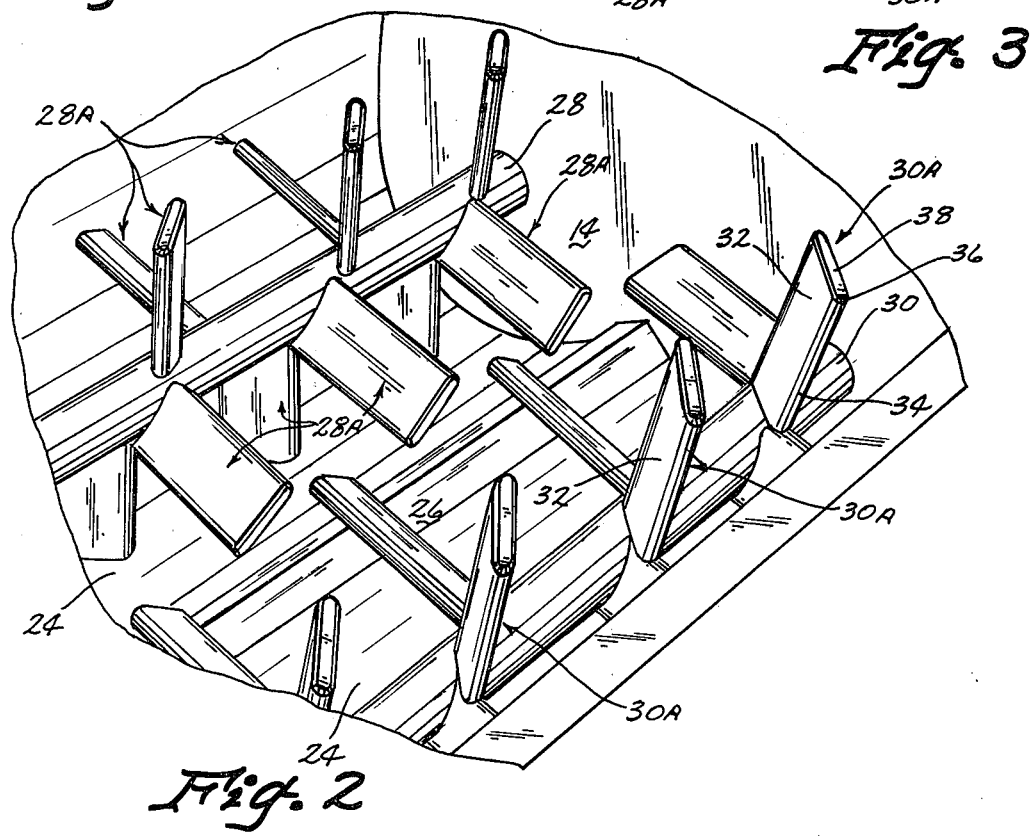
Fig. 2

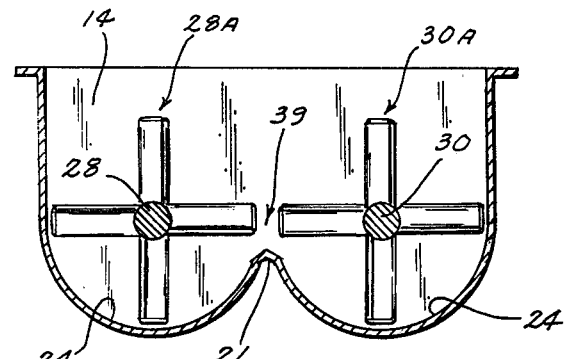
Fig. 4
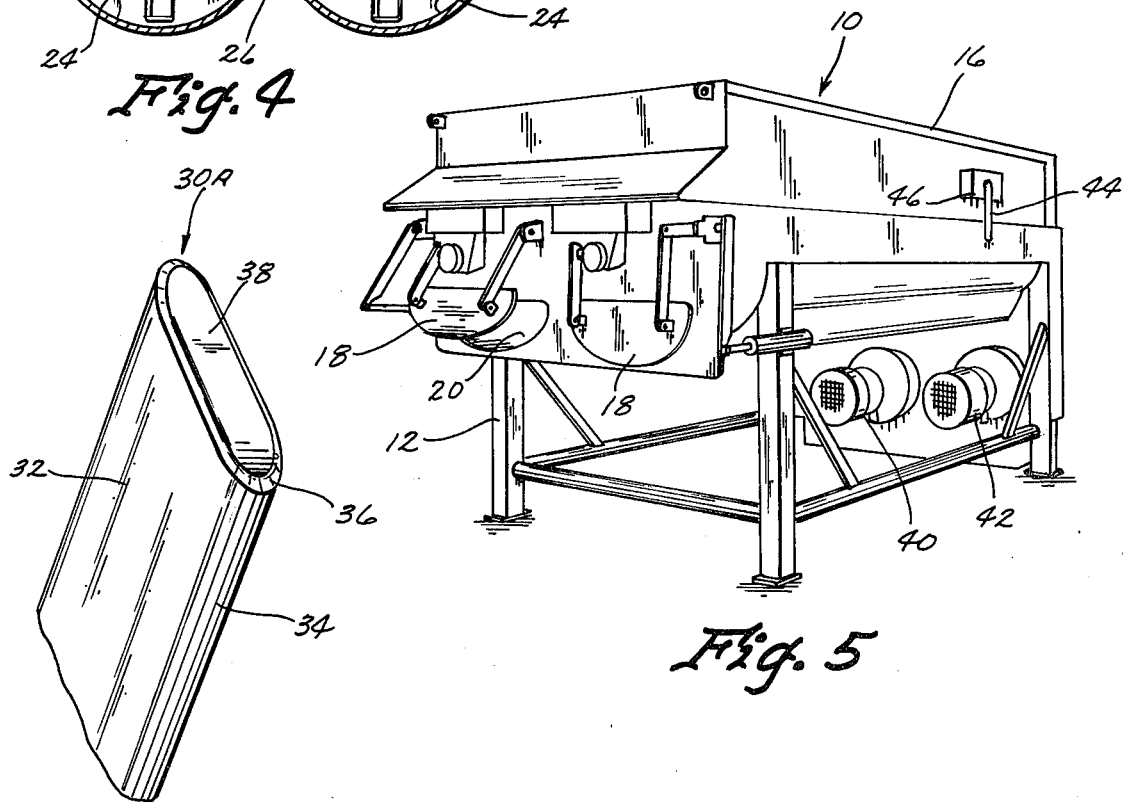
Fig. 6
Fig. 5

METHOD OF MASSAGING MEAT PRODUCTS

BACKGROUND OF THE INVENTION

Blending, mixing and massaging of meat products is common in the meat processing industry. Blenders or mixers are intentionally physically harsh on the meat products as the blending or mixing operations take place. By contrast, gentle meat massaging is done to cause protein to extrude from the meat (as with hams) to provide an adhesive for subsequently adhering the meat portions together. Existing meat massage units massage the meat under intermittant vacuum conditions, for a vacuum helps in the protein extracting process. However, existing machines take up to 24 hours to complete the massaging process as the meat is intermittently massaged and then rested. Further, the speed of the shafts of existing machines cannot be carefully controlled, and the loading and unloading of these machines is very burdensome.

SUMMARY OF THE INVENTION

This invention comprises a closable container having a pair of horizontal shafts therein with a plurality of closely spaced smooth paddles on each shaft. The shafts are individually and independently rotated by two hydraulic motors. A vacuum pump is in communication with the container for creating a vacuum therein. Discharge ports are located adjacent the ends of the shafts.

The method of the invention comprises placing ham portions or the like in said container, rotating said shafts in opposite directions so that ham portions between the shafts are moved upwardly therebetween by said paddles while a vacuum is drawn continuously on said container; rotating said shafts at 9–18 rpm's for 10–90 minutes whereby the massaged ham will have protein extruded therefrom for purposes of subsequently adhering the ham portions together, and releasing the vacuum and reversing the direction of rotation of said shafts to discharge said ham portions through the discharge ports.

A principal object of this invention is to provide a method and means for massaging meat in a short period of time.

A further object of this invention is to provide a method and means for massaging meat which will increase the yield of the meat product.

A further object of this invention is a method and means for massaging meat which is hydraulically operated at completely variable speeds.

A further object of this invention is a method and means for massaging meat which reduces material handling.

A further object of this invention is to provide a means for massaging meat which is easy and efficient to clean.

A further object of this invention is to provide a method and means for massaging meat which exposes more product area to massaging.

A further object of this invention is to provide a means for massaging meat products that is gentle with the meat products and which will not create damage thereto.

These and other objects will be apparent to those skilled in the art.

BRIEF DESCRIPTION OF THE DRAWINGS

FIG. 1 is a perspective view of the machine of this invention;

FIG. 2 is an enlarged scale partial perspective view of the paddle devices;

FIG. 3 is a partial top plan view taken on line 3—3 of FIG. 1;

FIG. 4 is a sectional view taken on line 4—4 of FIG. 3;

FIG. 5 is a perspective view showing the discharge ports of the machine; and

FIG. 6 is an enlarged scale perspective view of a paddle element.

DESCRIPTION OF THE PREFERRED EMBODIMENT

The numeral 10 designates the massaging machine having a supporting frame 12 and a massaging chamber 14. The chamber can be of any size but is preferably eight feet long by six feet wide and capable of holding up to 6,000 pounds of meat products. A cover 16 (FIG. 5) is hingedly connected to machine 10 and is adapted to be hydraulically closed to the position of FIG. 5. Hydraulically controlled discharge gates 18 are best seen in FIG. 5 to act in conjunction with discharge ports 20 adjacent the bottom and at one end of chamber 14. A loading hopper 22 is pivotally mounted for hydraulic operation on one edge of chamber 14, and is adapted to move from a filled horizontal position to the dumping position of FIG. 1.

As shown in FIG. 4, the bottom of chamber 14 is formed into two elongated semi-circular chamber portions 24 with a raised portion 26 therebetween. A pair of shafts 28 and 30 extend horizontally through chamber 14 at the approximate geometric centers of the arcuate chamber portions 24.

The foregoing structure is conventional in blenders and mixers, and the invention herein deals with the modifications made to this conventional structure to create an effective and efficient massage machine. However, these machines are not suitable for the meat massaging phenomenon, and this invention deals with the structural and functional changes which have been effected in these machines to create an extremely efficient meat massaging machine.

Because of its conventional construction, all details of the hydraulic controls discussed above have not been shown. In addition, for clarity purposes, the hopper 22 has not been shown in FIG. 5.

A plurality of paddles 28A and 28B are rigidly secured to shafts 28 and 30, respectively. All of the paddles 28A and 28B are generally flat and rectangular. They have opposite flat surfaces 32, opposite side edges 34, corners 36 and an outer end 38. The sides and ends of the paddles are gently rounded in shape to eliminate any sharp portions.

As shown in FIG. 3, the paddles 28A and 30A are intermittently spaced. The distance 39 between the ends of the oppositely positioned rows of paddles 28A and 30A (FIG. 4) is approximately four inches. Each paddle is mounted so that the plane of the paddle is disposed or pitched at a 45° angle with respect to the longitudinal axes of the shafts 28 and 30. Further, each paddle is disposed at an angle with respect to each succeeding paddle. Again, with reference to FIG. 3, it is seen that each paddle touches the next succeeding paddle, as the paddles are progressively positioned helically along the length and around the circumference of the shafts, and each occupies one-fourth of the circumference of the perimeter of the shafts. This places paddles at "twelve, three, six and nine o'clock" positions as indicated in FIG. 4.

Hydraulic motors 40 and 42 are operatively connected to shafts 28 and 30. Suitable and conventional hydraulic controls (not shown) are used to independently control both the speed and direction of rotation of the shafts.

Conduit 44 (FIG. 5) is connected to a vacuum pump (not shown) which is actuated by conventional control means 46.

The normal operation of the device of this invention is as follows: The hopper 22 is conventionally pivoted to a horizontal position where it is loaded with as much as 6,000 pounds of ham portions, for example. The hopper 22 is then conventionally tilted to the position of FIG. 1 where the ham particles are dumped into the chamber 14. The lid 16 is then conventionally closed and sealed upon the top of the chamber.

A vacuum (26 inches of mercury) is then conventionally drawn on chamber 14. The motors 40 and 42 are actuated so that shafts 28 and 30 are rotated in counter-clockwise and clockwise directions, respectively, as viewed in FIG. 4. This relative rotation of two shafts is not used in conventional meat blenders or mixers. The shafts are rotated at a slow speed of approximately nine to eighteen revolutions per minute.

It is important to maintain the vacuum conditions continuously throughout the massaging period, which should last for ten to ninety minutes. This causes the muscles of the meat to expand. This condition, along with the gentle massaging of the ham portions by the paddles, and the movements of portions with respect to each other, causes the protein myosin to extrude to the surface of the meat. Not only does the removal of the protein from the meat permit the meat portions to be subsequently adhered to each other to form composite ham portions, but the resulting portions are then more receptive to the absorption of brine. The degree to which the meat portions absorb the brine affects the ultimate yield or weight of the resulting meat product. The efficient and gentle massaging action of this invention often permits an increase in yield up to three percent over the original weight of the meat.

When the massaging period is completed, the vacuum is relieved. The original direction of rotation of one of the shafts 28 or 30 is reversed so that both shafts will then rotate in the same direction. At least one of the ports 20 is opened, as by conventional cylinders, and the meat material then exits the chamber 14 through the opened port 20 for deposit into a suitable container.

The speed of rotation of the shafts 28 and 30, the shape and position of the paddles, and the continuous vacuum conditions work together to accomplish the completed massaging process in approximately 10–90 minutes, instead of three to eighteen hours which is now customary in the trade. By achieving a shorter working period, the space requirements of the operation are substantially reduced. The shorter operating time further reduces micro-biological concerns attendant to longer massage periods. The hydraulic motors 40 and 42 permit a complete range in operating speeds as conditions may require. The meat products are gently treated and damage does not significantly occur, even when whole hams are massaged. The chamber 14 and related equipment are easily cleaned.

From the foregoing, it is seen that this invention will accomplish at least all of its stated objectives.

What is claimed is:

1. The method of massaging meat products, comprising, placing meat products in a chamber having at least a pair of horizontal shafts therein with a plurality of paddle elements thereon, said paddle elements being helically disposed in a longitudinal direction on said shafts and being substantially flat with generally smooth and arcuate perimeter edges, rotating said shafts in opposite directions at a speed of 9 to 18 revolutions per minute to move the paddles dwelling in a position between said shafts in an upward direction and to massage said meat products with said paddles, and subjecting said chamber to vacuum conditions continuously while said shafts are rotating for a period of time sufficient to cause the muscles of the meat to expand which along with the massaging of the meat causes protein contained therein to extrude to the surface of the meat whereby the meat products subsequently adhered to each other.

* * * * *